United States Patent [19]

Anderson et al.

[11] Patent Number: 5,799,310

[45] Date of Patent: Aug. 25, 1998

[54] RELATIONAL DATABASE EXTENDERS FOR HANDLING COMPLEX DATA TYPES

[75] Inventors: Matthew Paul Anderson, Morgan Hill; Siyi Terry Donn, Saratoga; David Couttie Fallside; Tri Q. Ha, both of San Jose; Douglas Michael Hembry, Los Gatos; Jean C. Ho, Saratoga; Jing-Song Jang, Cupertino; Nelson Mattos; Carlton Wayne Niblack, both of San Jose; Dragutin Petkovic; Frank Chin Tung, both of Saratoga; Peter Paval Uhrowczik, Los Gatos; Mimi Phuong-Thao Thi Vo, San Jose; Gerald Johann Wilmot, Marina; Peter C. Yanker, Mountain View; Josephine Min-Kung Cheng, San Jose, all of Calif.

[73] Assignee: International Business Machines Corporation, Armonk, N.Y.

[21] Appl. No.: 548,301

[22] Filed: Nov. 1, 1995

[51] Int. Cl.$^6$ ..................................................... G06F 17/30
[52] U.S. Cl. ............................ 707/102; 707/103; 707/2
[58] Field of Search ........................... 395/200.01, 335, 395/602, 603, 421.07; 396/617, 609, 614, 326; 707/2, 102, 103

[56] References Cited

U.S. PATENT DOCUMENTS

| | | | |
|---|---|---|---|
| 4,819,152 | 4/1989 | Deerfield et al. | 395/421.07 |
| 4,959,776 | 9/1990 | Deerfield et al. | 395/421.07 |
| 5,303,367 | 4/1994 | Leenstra, Sr. et al. | 707/102 |
| 5,313,630 | 5/1994 | Namioka et al. | 395/614 |
| 5,335,346 | 8/1994 | Fabbio | 395/609 |
| 5,446,575 | 8/1995 | Lysakowski, Jr. | 395/200.01 |
| 5,499,371 | 3/1996 | Henninger et al. | 707/102 |
| 5,546,576 | 8/1996 | Cochrane et al. | 395/669 |
| 5,553,234 | 9/1996 | Cotner et al. | 395/182.14 |
| 5,579,471 | 11/1996 | Barber et al. | 395/326 |
| 5,604,899 | 2/1997 | Doktor | 395/603 |
| 5,611,076 | 3/1997 | Durflinger et al. | 707/102 |
| 5,615,362 | 3/1997 | Jensen et al. | 707/103 |
| 5,617,567 | 4/1997 | Doktor | 395/602 |
| 5,627,979 | 5/1997 | Chang et al. | 395/335 |
| 5,652,882 | 7/1997 | Doktor | 395/617 |

OTHER PUBLICATIONS

DeFazio et al. "Database Extensions for Complex Domains", Data Engineering, 1996 12th Int'l Conf., pp. 200–202.

Cheng et al. "An Efficient hybrid Algorithm: A DB2 Prototype", Data Engineering, 1991 7th In't. Conf., pp. 171–180.

Gardarin et al. "Extending A Relational DBMS to Support Objects", IEEE, pp. 131–137, 1989.

Farris, A. "Modeling Complex Astrophysics Data", Scientific and Statistical Database, 1994 7th Int'l Working Conference, pp. 149–158, Feb. 1994.

(List continued on next page.)

*Primary Examiner*—Thomas G. Black
*Assistant Examiner*—Charles L. Rones
*Attorney, Agent, or Firm*—Sterne, Kessler, Goldstein & Fox P.L.L.C.

[57] ABSTRACT

This invention is directed to relational extenders for a computer-based relational database. Each relational extender includes at least one column, in a first, business, table containing a user defined application database, dedicated to object handles for defining the complex data type of an object; a second, attribute, table containing at least one column defining a unique characteristic associated with the one object and one column dedicated to containing the object handle; and a third, metadata, table containing at least one column defining a common characteristic associated with all objects defined within the business table and one column dedicated to containing the object handle and at least one column dedicated to containing a reference to object data associated with the object. The relational extender further includes a fourth table containing a reference to each object handle column defined in the first table, and a fifth table containing the names of the second and third tables for each object defined in the first table.

3 Claims, 7 Drawing Sheets

OTHER PUBLICATIONS

Schlatter et al. "The Business Object Management System", IBM Systems Journal, v.33, n2, pp. 239–263, 1994.

Dai, Haihong "An Extended Object–Oriented Data Model for Complex Inter–Entity Relationships", TENCON '94 1994 IEEE Region 10 Conf. on Frontiers, pp. 402–406.

Chang et al. "A Universal Relation Data Model with Semantic Abstractions", IEEE Transactions on Knowledge and Data Engineering, v.4, n.1, pp. 23–33, Feb. 1992.

"Informix to Acquire Illustra", *Illustra*, Illustra Information Technologies, Dec. 20, 1995.

"Illustra Information Technologies: Technical Overview: Illustra: The DBMS for all of your data", *Illustra*, Illustra Information Technolgies no date.

Okon, Chris, "Image Recognition Meets Content Management for Authoring, Editing & More", *Advanced Imaging*, pp. 60–62, Jul., 1995.

RELATIONAL DATABASE EXTENDERS FOR HANDLING COMPLEX DATA TYPES

TECHNICAL FIELD

This invention relates to relational database systems, and more specifically to a relational database system that handles complex data types emerging from advanced applications, such as multimedia, while maintaining application development productivity and reducing application complexity. The invention uses relational extenders to extend a database business table with new complex data types in that these new data types appear to application developers as seamless extensions to SQL (Structured Query Language).

GLOSSARY OF TERMS

For convenience, the following glossary of acronyms is provided for ease of understanding of the disclosure of this invention.

BLOB=Binary Large OBject
BMP=Bit MaP
CLOB=Character based Large OBject
DB2=Data Base 2
DBCLOB=Double Byte Character Large OBject
DBMS=DataBase Management System
GIF=Graphic Innterchange Format
GUI=Graphical User Interface
LAN=Local Area Network
LOB=Large OBject
MIDI=Musical Instrument Digital Interface
QBIC=Query By Image Content
RDB=Relational DataBase
SQL=Structured Query Language
TIFF=Text Image File Format
UDF=User Defined Function
UDT=User Defined Type
UMQ=Ultra Media Query
VOD=Video On Demand

BACKGROUND ART

A. In General

Complex forms of data are emerging in many application domains, notably in multimedia (for example, image, video, and audio), but also in specialized application areas such as medical care (X-Rays, MRI imaging, EKG traces), geographical systems (maps, seismic data, satellite images), and finance (time series data). The new forms of data are sometimes referred to as "unstructured" data. In reality, the new data types are distinguished from traditional scalar numeric and character data by their multiple attributes, complex internal structure, and specialized behavior. For example, a video clip, as perceived by an application program, is not just a large binary field, it has attributes such as duration, format, number of frames, subject description, and information relating to legal ownership. It may also have associated index information, allowing search, positioning, and retrieval based on the content of individual frames. The video clip may have unique functions that could be used by an application program to retrieve selected portions of the clip, search for subject matter based on a combination of description and frame content, display, zoom, and edit the content, and return the clip to storage. These functions are clearly specific to the video clip data type and it would make no sense to perform them on some other data types, such as a static image.

Complex data types need to be stored in corporate databases, either in support of new applications, or to extend existing applications. In many cases, an application will require more than one new complex type in the same database or table. For example, a consolidated health care patient records system would probably require a database to contain many of the specialized medical data types mentioned above, as well as traditional data describing personal information, insurance details, etc.

In the database, complex data types must be capable of being searched, accessed and manipulated through the standard SQL language, without breaking the familiar table paradigm. Moreover, SQL support must be provided for the advanced technologies that are evolving to perform searches on the contents of large objects ("BLOBs"). Text search is a well known example, but algorithms also exist today for identifying images based on color, texture and shapes (for example, the Query By Image Content (QBIC) and Ultimedia Query (UMQ)), and the pattern matching techniques applied by IBM™ and Excalibur Technologies™ Corporation to fingerprint searching in the DB2™ Fingerprint Extender. Research is also proceeding into query by content of video and audio data. It must be possible to perform combined database queries that specify such content search criteria as well as criteria for traditional data search.

When the need for a complex data type is encountered in an application development project, a user might consider implementing the new type as an integrated part of the application. The attributes and structure of the data type might be stored in a special table; the handling of this table, and the special operations for the data type might be built into the application itself. Isochronous data such as video clips might be stored on a file server and the file names managed by the application program. However, such an approach has considerable disadvantages. The custom design and implementation of support for complex data every time it arises in an application would result in a large redundancy of effort and would add cost to advanced development projects. Also, the complexity of applications would increase because of the details of the data types that are visible in the application. Complex data types tend to require specialized skills for their definition and use, and by creating them as an integral part of an application, those skills will be needed in the application development team. The overall effect (and probably the most important disadvantage) is that a "roll-your-own" approach to handling these data types will ultimately slow the rate at which new advanced functions can be incorporated into corporate applications. The situation would be analogous to that which existed perhaps 30 or 40 years ago, when users tended to develop their own customized DBMS.

What is needed is a means of separating the specification and implementation of the structure and behavior of new complex data types from the development of the client applications that use them. An open architecture is required that allows the users themselves to create new data types, for use in many applications. The architecture should allow the installation of a new data type in a data base environment as needed, and independently of database product releases. It should mask the complexity of the data types from the applications. Effectively, it should bring complex data types under the umbrella of the data base system for all purposes of application access, security, and administration. In this way, user application development productivity may be improved, development complexity reduced, and the delivery of advanced function accelerated.

The challenge is to provide this open architecture that enables the development of specialized data types by users.

The architecture must address the need to integrate the new data function seamlessly with existing RDB functions. The strategy must encourage the commercial development of new relational data types of broad applicability, both across industries, and within specialized industry domains.

This invention comprises Relational Extenders which are an architecture, a set of products designed to help RDB users handle emerging new complex data types in advanced applications and improve application development productivity, and reduce development complexity. Relational Extenders define and implement new complex data types in RDBs. The Relational Extender paradigm is essentially to extend corporate relational data with new data types'. Relational Extenders encapsulate the attributes, structure and behavior of new data types and store them in a column of a RDB table, such that they can be processed through the SQL language as natural additions to the standard set of RDB data types. Relational Extenders are separate from the database system itself, in the sense that they can be developed, installed and used independently of full database product releases, but they are also part of the database in that they appear to application developers as seamless extensions to SQL and the RDB product.

B. The Impact of Multimedia

Deployment of multimedia applications in the commercial environment is in its beginning stages. Today it is primarily deployed stand-alone on isolated work stations, but it is expanding to departmental LAN environments. In the 1994–1995 timeframe, customers in the commercial market are actively piloting departmental multimedia solutions with local or remote client access. As the LAN solutions mature, then, will evolve to enterprise LAN solutions in the 1996–1997 time frame.

Studies show that multimedia deployment in the commercial environment falls into five general application classes: (1) Presentations/Training/Kiosks, (2) Multimedia extensions to corporate data, (3) Query applications, (4) Commercial video on demand, and (5) Document management. Data management plays a role in all of these application areas because the multimedia data needs to be organized, preserved, managed, updated, searched and delivered to a potentially large number of users.

1. Presentations, Training, Kiosk:

This class encompasses applications which are normally developed with authoring tools. Some examples are: corporate dissemination of information to employees, travel agency type desktop sales demonstrations, and factory floor training modules. To date, the majority of multimedia applications are in this class and execute on stand-alone workstations; however, customers recognize the value of moving to client-server configurations for greater flexibility and functionality and to better leverage the use of multimedia.

2. Multimedia Extensions to Corporate Data:

This class consists of operational applications which utilize traditional corporate data in RDBs in combination with unstructured data (text, image, video, audio, etc.). These applications will initially be extensions of existing applications, but the ability to link corporate data with multimedia data will open up new application areas. One example of this application class would be a health care provider that wants to consolidate patient information, including image based test results and audio annotations by physicians, in a RDB. Another example is the addition of images or video clips to a retail catalog sales application for interactive shopping. Most commercial environments have traditional database applications today which can be extended with multimedia content in order to interact better with application users or consumers.

3. Query Applications:

Query applications are a subset of the other application classes. This class encompasses the case where the data being queried is a combination of traditional data and multimedia data. Examples include ad-hoc queries for decision support in retail buying or stock market analysis. But query may be used to determine what training modules are available or to find appropriate images to incorporate into a new application.

4. Commercial Video on Demand:

Video on demand (VOD) can be divided into two market categories: the commercial market and the consumer market. For purposes of this proposal, we are only addressing video on demand in the commercial market. In this market, end users access videos via a workstation at their desk, rather than a settop box and television. An example of commercial VOD is the dissemination of news clips to brokers in offices around a wide geographic area. Commercial VOD applications will be deployed in cases where the ability to deliver current information quickly is essential or where the quantity of information is so large that duplication of the information is impractical.

5. Document Management:

Document management applications are used in businesses where the requirement is to manage documents and records as images of the hardcopy originals and to group them by customer. A typical user is an insurance company which uses document management application to process policies and claims.

Data management plays an important role in the application areas described above. As collections of multimedia objects become large, efficient data management capabilities are required to organize, preserve, manage, update, search and deliver these objects to a potentially large number of users. So customers need ways of managing multimedia objects as business assets. Multimedia encompasses a wide range of data types which have not previously been associated with corporate data. Providing additional data types in the database makes it easier to relate multimedia data to traditional data. When multimedia data is managed by the database, customers can efficiently search on the attributes of the data, but new technology for searching the content of the multimedia objects can be deployed via the database too.

DISCLOSURE OF INVENTION

This invention is directed to relational extenders for a computer-based relational database. Each relational extender includes a first, business, table containing a user defined application database having at least one column dedicated to an object handle created by the user for defining the complex data type of one object; a second, attribute, table containing at least one column defining a unique characteristic associated with the one object and one column dedicated to containing the object handle; and a third, metadata, table containing at least one column defining a common characteristic associated with all objects defined within the business table and one column dedicated to containing the object handle and at least one column dedicated to containing a reference to object data associated with the object. The relational extender further includes a fourth table containing a reference to each object handle defined in the first table, a fifth table containing the names of the second and third tables for each object defined in the first table, a sixth table containing a reference to each object handle removed from the first table and including one column dedicated to containing a reference to the location of the object data associated with the removed object handle, and a seventh table having at least one column which describes a property of an object defined in the first table.

Additional features of this invention will become apparent from the following detailed description of the best mode for carrying out the invention and from appended claims.

BEST MODE FOR CARRYING OUT THE INVENTION

I. Overview of the Invention

Relational extenders define and implement new complex data types and essentially extend relational data tables with these new data types. The relational extenders of this invention were designed to be implemented with DB2™ Version 2, available from IBM™ Corporation. It should be understood that the relational extenders of this invention are not limited to DB2™ Version 2. They may be implemented with any of a number of other RDBs. For convenience, however, in the following description of the best mode for carrying out the invention, the relational extenders will be described particularly in the context of their application to DB2™ Version 2.

Figure 1:
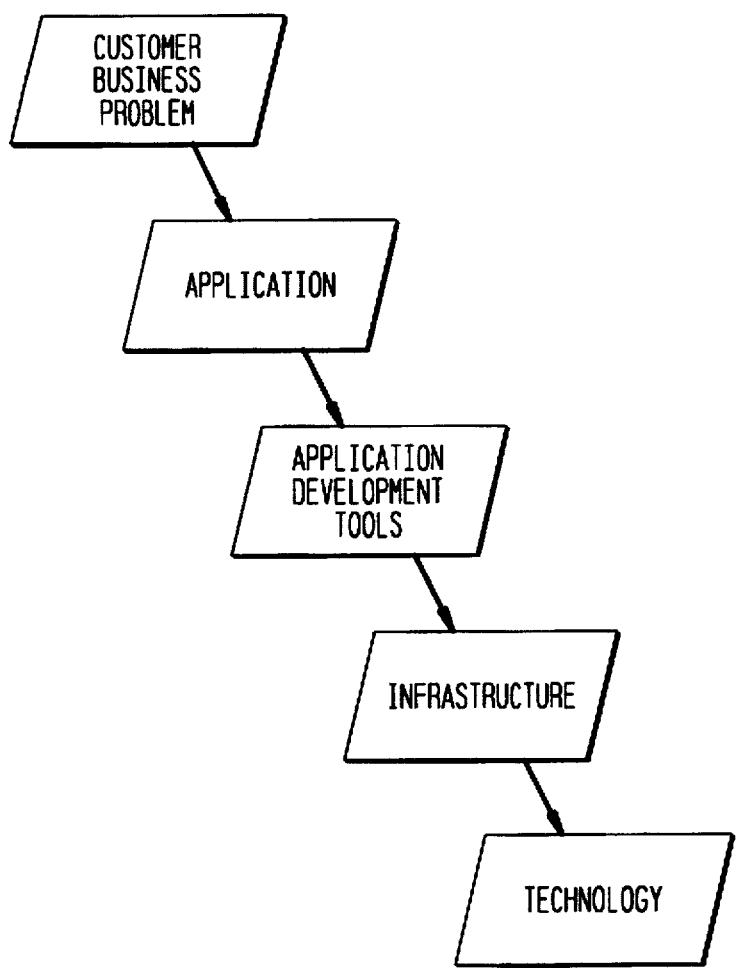
FIG. 1 shows a high level overview of the database role in multimedia applications.

FIG. 1 depicts the database role in multimedia applications. As noted above, studies show that multimedia deployment in the commercial environment falls into five general application classes: (1) Presentations/Training/Kiosks, (2) Multimedia extensions to corporate data, (3) Query applications, (4) Commercial video on demand, and (5) Document management. The application of interest to the customer is developed with application developer tools, which may include visualAge™, MEDIA Script™, IconAuthor™, or Media Editors™. The development tools utilize the infrastructure of a database system such as that of this invention of relational extenders, multimedia extensions (MCI™, MMPM/2™, Quicktime™, client application enablers, and DB2™). The database infrastructure access the underlying technology such as QBIC, text search, and UDFs and UDTs.

Figure 2:
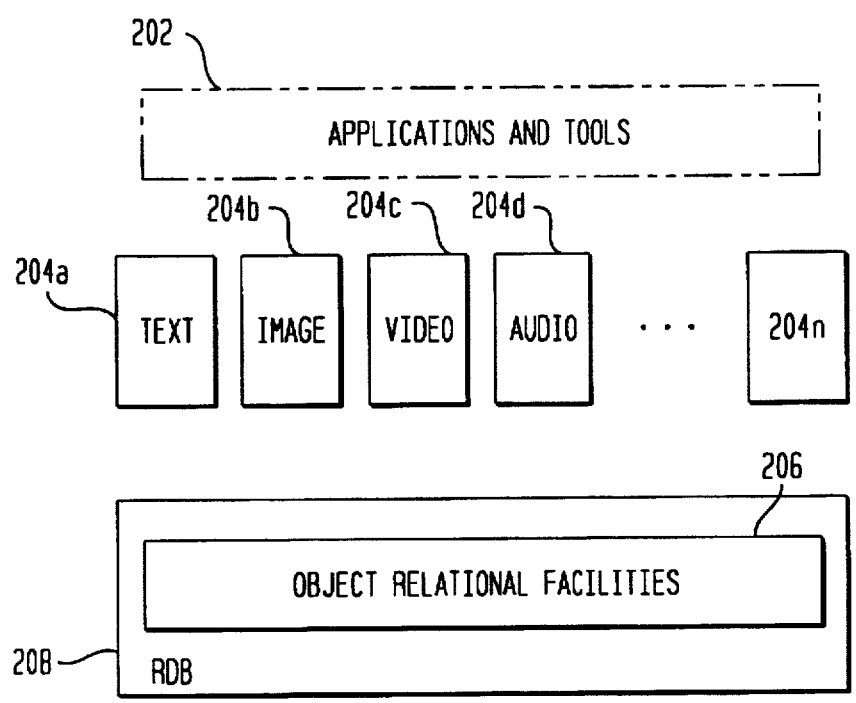
FIG. 2 shows the structure of the relational extenders of this invention.

FIG. 2 shows the structure of the relational extenders of this invention, in which 202 represents a user application and tools. Various types of relational extenders 204a, . . . 204n, such as an audio extender, video extender, text extender, and user created extender, are logically associated with the object relational facilities 206 introduced by the RDB 208.

The foundation for the relational extenders is a set of object relational facilities introduced by DB2™ version 2. DB2™ is commercially available from IBM™, Corporation. The object relational facilities are an initial implementation of selected parts of the emerging SQL3 standard, and comprise user defined types (UDTs), user defined functions (UDFs), Large Objects (LOBs), triggers and checks.

A UDT allows a new data type, derived from a standard DB2™ data type, to be defined to the database engine. The database engine subsequently treats this UDT in a strongly typed manner, and ensures that an application uses a data item of a particular type only where such a data item is expected.

UDFs allow new functions to be defined, written in C or C++, or derived from built-in functions. Through the signature of its parameter list, a UDF may be associated with a particular UDT or standard type. A UDF may be used anywhere in an SQL expression that a standard DB2™ built-in function can use, and thus provide the mechanism for the seamless extension to the SQL language.

DB2™ triggers allow automatic dispatch of specific procedures whenever a relation table is the subject of an update, deletion, or insertion. Multiple triggers are allowed, with user control over their order of execution. DB2™ checks implement constraints on values stored in relation tables. A trigger or check is typically used to implement a business rule on a table, since it will always be invoked whenever the table is changed, without the knowledge or cooperation of the application code. In a relational extender context, triggers are typically used to maintain the internal structures or indexes of a complex data type.

Using these DB2™ building blocks, relational extenders treat each new and complex data type that is to be incorporated into a RDB as an object. Every object possesses hidden attributes that are accessed through a functional interface. An application program only has visibility to the interface, wherein the implementation details of accessing an object's attributes are invisible to the application.

Figure 3:
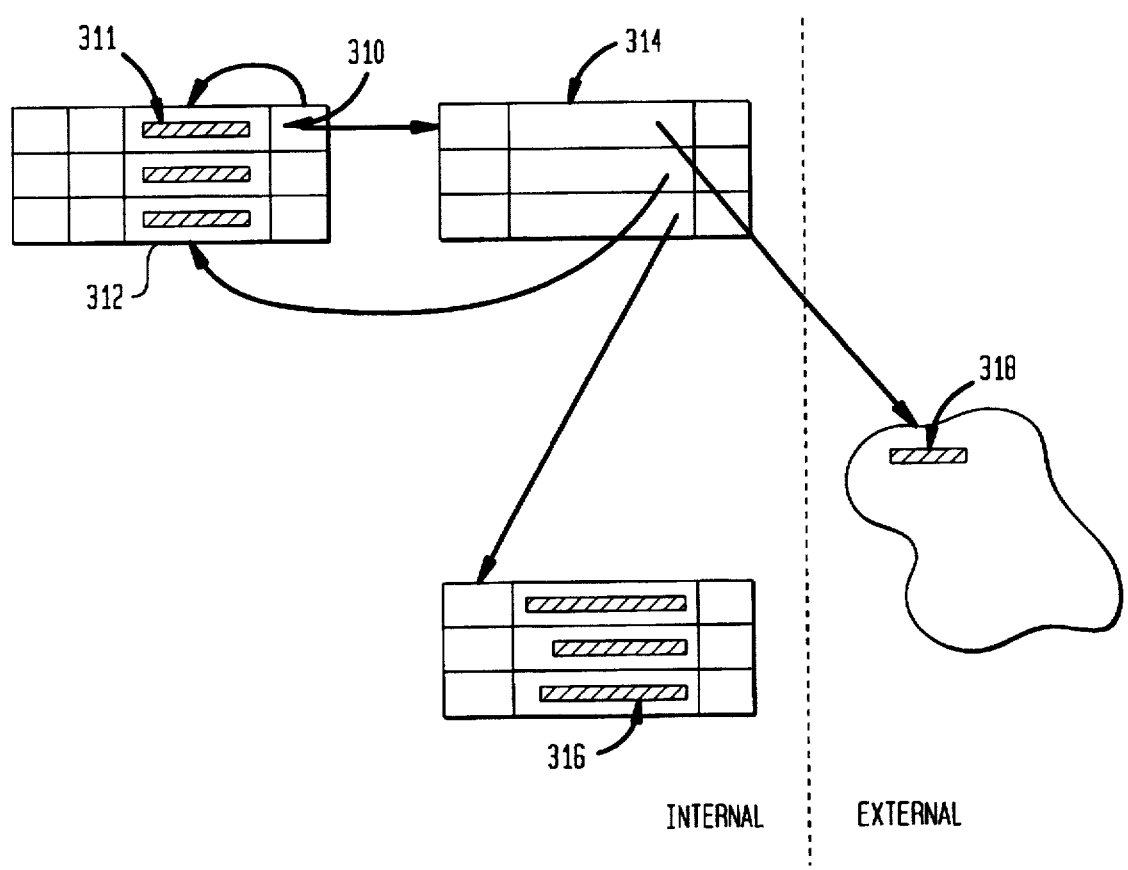
FIG. 3 shows a general relational extender data model.
Figure 4:
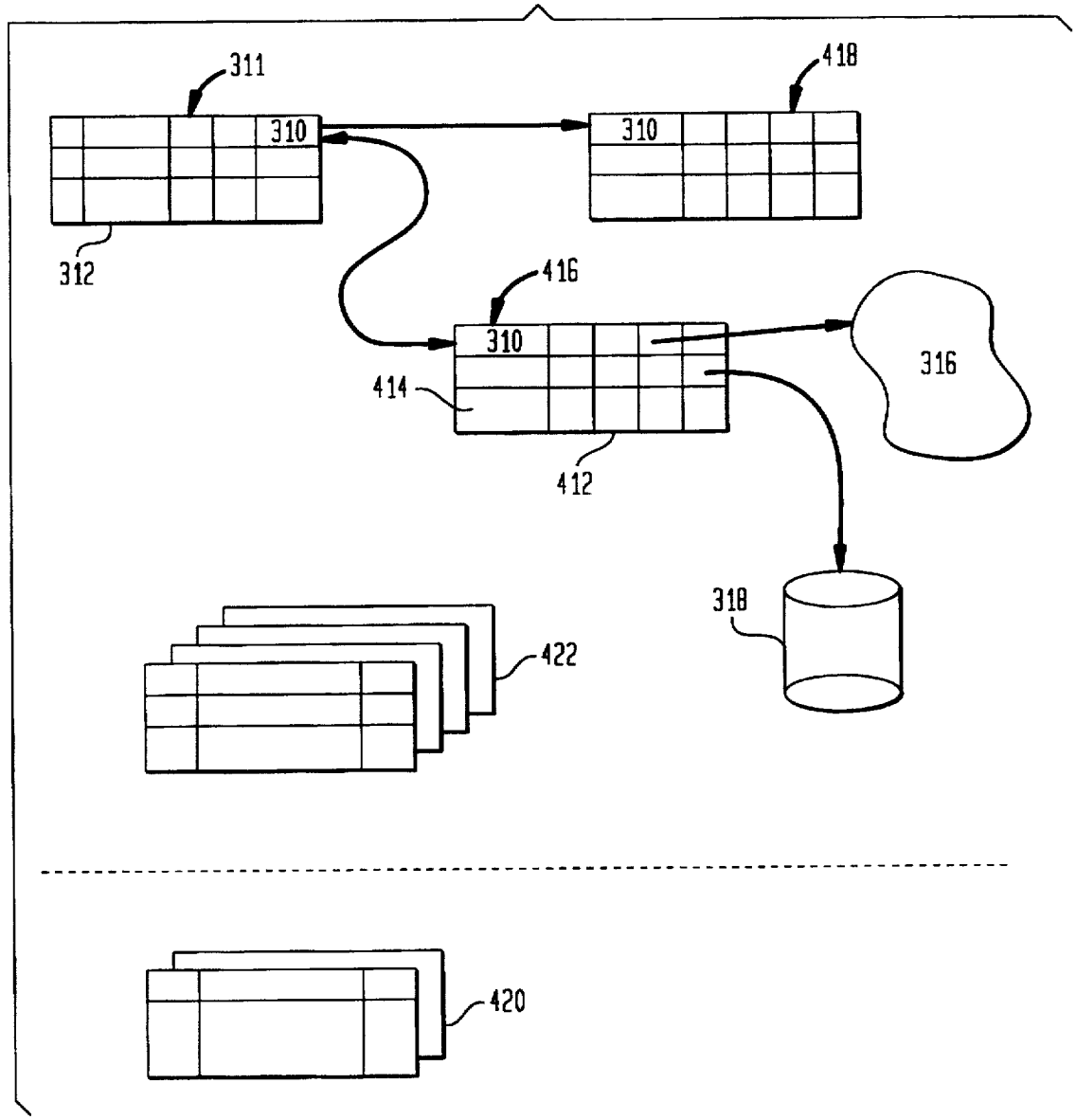
FIG. 4 shows a detailed relational extender data model.

FIG. 3 is a general relational extender model and FIG. 4 is a more detailed drawing of a relational extender data model. As shown in FIG. 3, an object has a unique object handle (identification label) 310 which the user application stores in a column of a business data table 312 to represent the object. The object handle 310 points to an entry in an Attribute Table 314. The entry in Table 314 in turn points to the location of an object BLOB in a hidden table 316 or in an external file 318. Alternatively, an object BLOB may be stored in a DB2™ column 311 of a business data table.

As shown in more detail in FIG. 4, a business table 312 column containing the object handle 310 is defined as the corresponding complex data type, or UDT. The interface to the object consists of UDFs, that take the object handle as a parameter and store, access, retrieve, search, and otherwise manipulate the object data.

An object may have multiple attributes which the database engine stores in separate tables 314. Those attributes that are common to all objects, regardless of the data type, are stored in a Base Metadata Table 412. Such attributes include: the name of the person creating the object, the date of creation, and the location of the actual object data. There is one Base Metadata Table for each user business data table. The table has one row 414 for each extender column 416 (a column that is enabled for a relational extender). Those attributes that are specific to the object data type are stored in the Attribute Metadata Table 418. There is one Attribute Metadata Table 418 for each enabled extender. For example, if a user business data table has been enabled for an image extender and an audio extender, it will have two Attribute Metadata Tables 418. An Attribute Metadata Table 418 may include such attributes for a video data type as the number of frames and the frame size, whereas for an audio data type, the table may include the attribute for the duration of play.

Alternatively, object attributes may be packed into the object handle 310 in the business table 312, depending on the size and number of attributes to be stored. For a small number of small attributes that are heavily accessed, this structure will provide faster access.

Some of the object attributes, either common or specific attributes, may be automatically set from the creation of the object. This would include static information contained in the header of the data, or information that the user provides upon creation. It may not be appropriate to change such information, in which case, the user application is only provided with functions to access these attributes, and not to set their values.

The object interface provides the user application with UDFs which access all of the attribute values, including the object data itself. Regardless of the implementation of object attributes, the object attributes are not directly accessible from a user application as columns in a relational table. These UDFs are strongly typed against their corresponding UDTs.

When the user application executes a function which alters the object data, a trigger may be initiated which will automatically update one or more object attributes related to the change. For instance, if a user application deletes a portion of a video object data, the number-of-frames attribute is automatically updated to reflect the new size of the video object data.

The choice of storage for object data is made when the user creates the object and imports it into the business data table. The object data may be stored either in a DB2™ BLOB column 311 of a business table 312 and directly accessible by the user application, or in a BLOB column 316 of a Base Metadata. Table 412 or in an external file 318, both of which are under control of the object interface functions and thus hidden from direct access by the user application.

The invention also contains two or more relational tables 420 422 that are used for administration purposes. There is one Extender Information Table for each database engine. This table stores all of the relational extenders for which the database engine is enabled. It also records the UDT associated with each recorded extender. A Metadata Information Table also exists for each database engine. This table records the name of the Base Metadata Table and Attribute Metadata Table associated with a user table which has been enabled for a particular extender. There is a Delete Log Table for every extender which records all file names associated with extender columns in rows that are deleted. There is also a Column Information Table for each extender of the database engine. This table records the property characteristics of all the columns that are enabled for a particular extender. There is one row per extender column.

Figure 5:
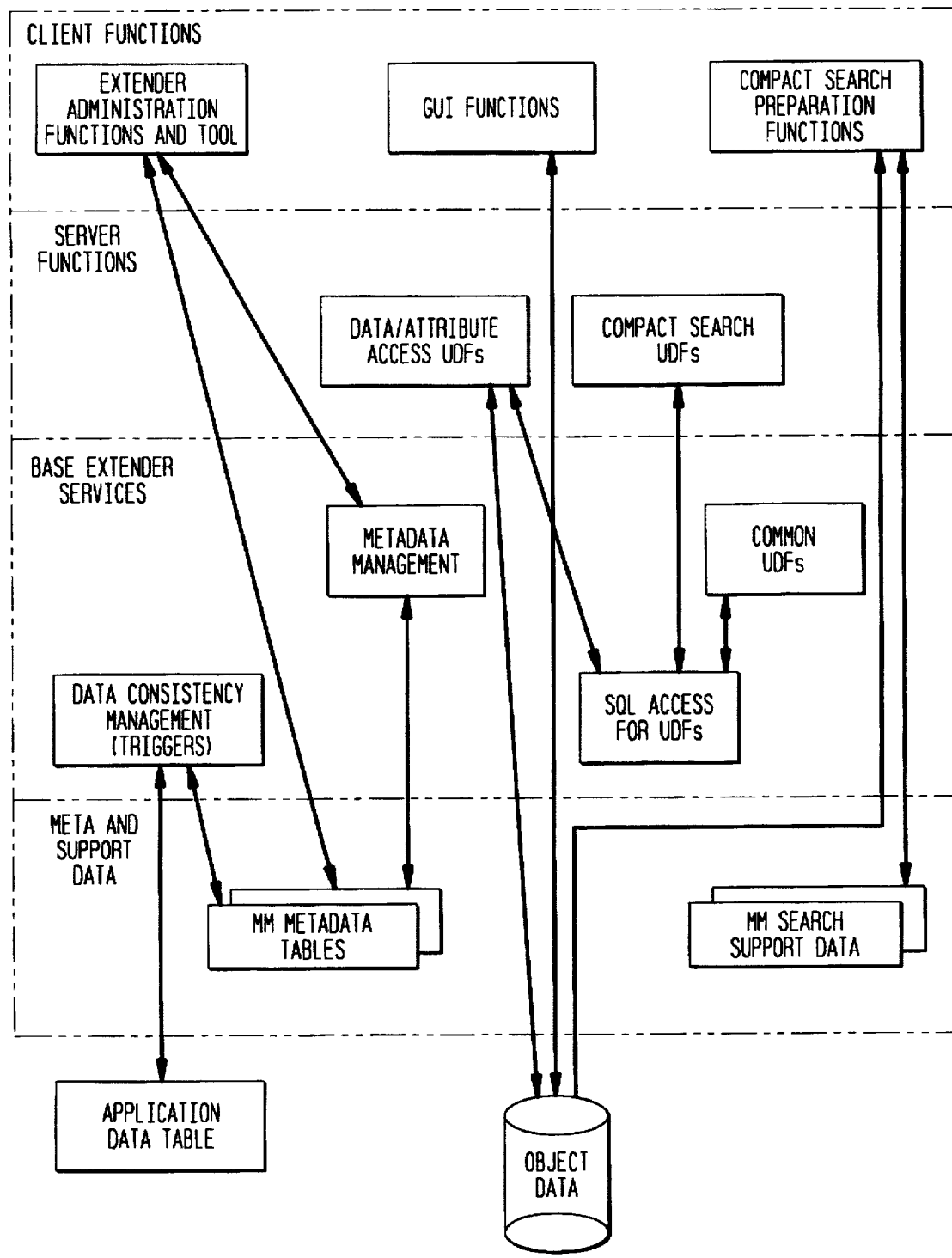
FIG. 5 shows the data flow of a relational extender.

FIG. 5 shows the data flow of a relational extender. The user's application data table and object data are the bottom layer of the system. Metadata tables are maintained to manage and access the data tables. In addition, search support services (such as QBIC) are available for various object data types. Base extender services ensure data consistency management through the use of triggers that are specific for each object data type. Upon execution of a function that manipulates object data, the corresponding trigger automatically updates the object's metadata table and the user's application data. Other services enable application tables to define relational extenders, through metadata management, enable users to create unique functions with the use of SQL and UDFs, and provide users with a common set of UDFs including functions such as import. The next layer provides users with an interface containing functions that access object data and specific attributes of each relational extender and provide content search functions that manipulate the object data. Client functions exist for extender administration functions and tools such as allowing the user to set up data tasks and relational extenders. GUI functions provide the user with browse and playback capabilities of the object data. Content search preparation functions manipulate and search the object data based on its data type.

Figure 6:
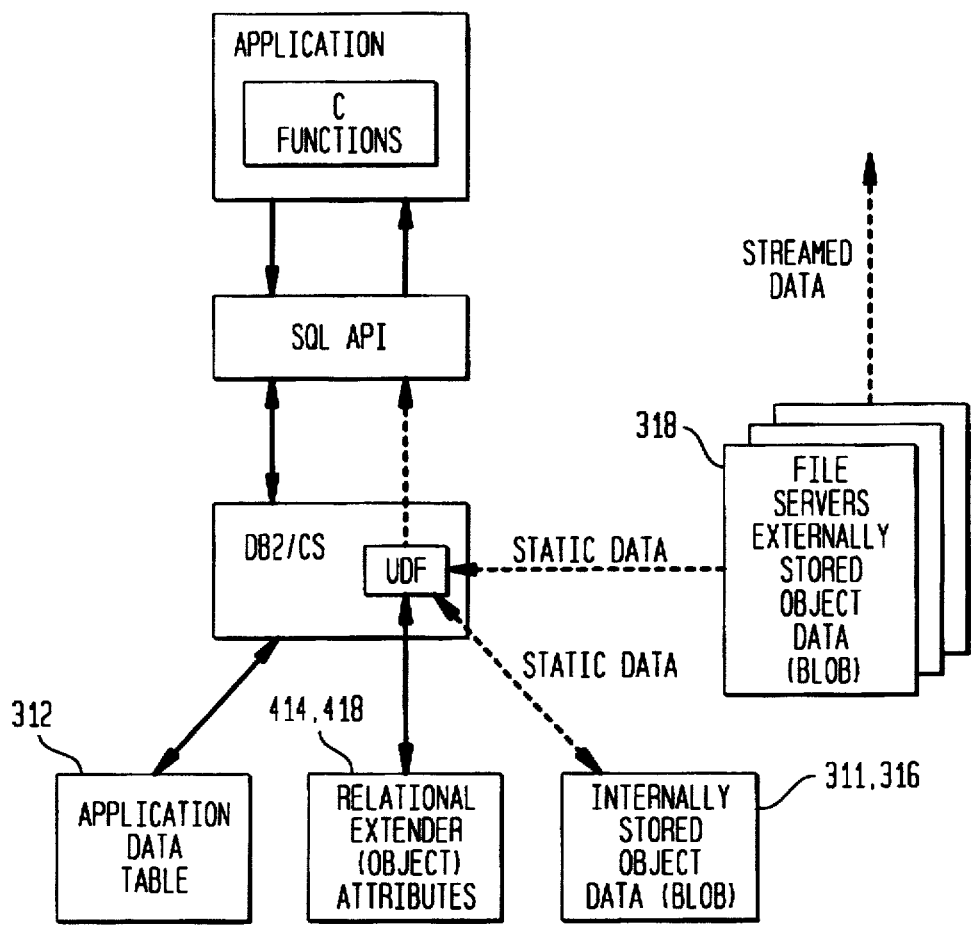
FIG. 6 shows the interfaces between a relational extender and an application DBMS.
Figure 7A:
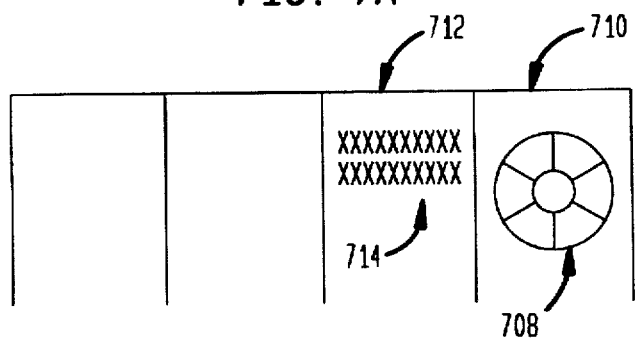
FIG. 7 shows multiple ways that text can be used in combination with other data types in a data table.
Figure 7B:
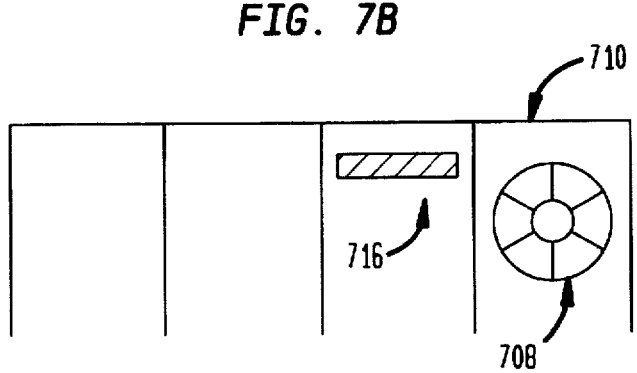
Figure 7C:
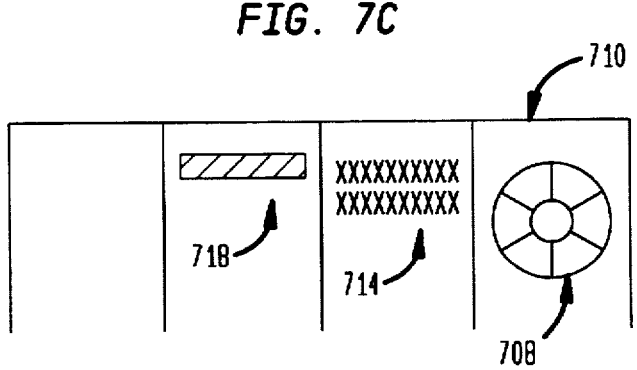
Figure 7D:
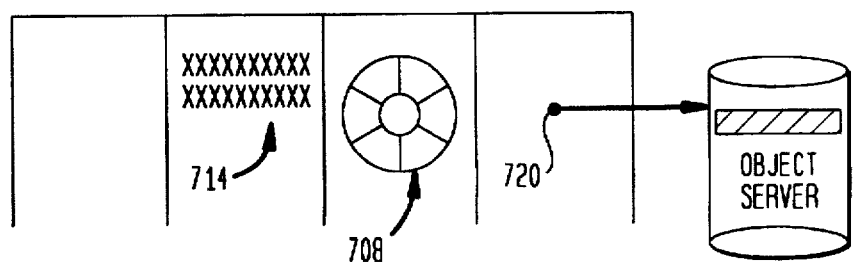

FIG. 6 shows the interfaces between a relational extender and an application DBMS. The user's application comprises a traditional business database table 312. The table contains at least one user-defined or predefined multimedia relational extender object 310. For each object defined in the data table, the object attributes are maintained in separate tables 418, 414. These tables include search functions appropriate for the corresponding object data type. The actual object data is maintained either internally 311, 316 or externally on a file server 318. The user application can accesses and manipulates the object data through the SQL application program interface (API). The SQL API in turn invokes DB2™ that access the object data directly. The DB2 interface includes standard DB2 functions, pre-defined multimedia relational extender functions, and UDFs. This structure hides the implementation details of object data from the user application. It provides the user with a fast and efficient mechanism of accessing and manipulating complex data objects.

II. Sample Relational Extenders

Four extender products offer a public functional interface that is perceived as an extension to SQL, and all four interfaces share a similar look and feel, with common functions where appropriate. These extender products are: DB2™ Text Extender, DB2™ Image Extender, DB2™ Video Extender, and DB2™ Audio Extender. The data for all the data types can coexist in a table, and can be queried in the same SQL statement. DB2™ table resident data may be stored on either DB2™ for AIX version 2, or DB2™ for OS/2® version 2. External servers supported are the OS/2® Lan Server Ultimedia, and AIX RISC System/6000 platforms.

A. DB2™ Text Extender

The DB2™ Text Extender supports text documents stored in a business table as either DB2™ LOBs or as traditional DB2™ Character data types (VARCHAR, LONG VARCHAR). This choice of storage forms helps users to apply the text extender search technology to legacy text data that already exists in corporate DB2™ databases.

The DB2™ Text Extender provides UDFs that encapsulate full-text search technology as contained in the commercially available IBM™ Searchmanager™ product. The functions may be embedded in predicates of SQL queries in application programs, to search the content of text data contained in columns of a business table. SQL queries on a table may specify combinations of predicates on traditional data in the table, on text attributes (encoding format), and on text content in one or more text columns of the table at the same time, taking account of ranking information returned by the text search engine. Thus a single query may search on document date and author's name, which may be stored in standard data columns in the table, as well as on the content of the document, which may be stored in a LOB column.

The text search engine in the DB2™ Text Extender allows:

Synonym search, where an exact match of text does not need to be found. For example, a conceptual search on "airplanes" might result in matches not only on all documents about airplanes, but also on documents about helicopters and gliders.

Proximity search, where documents are chosen because they contain have words close to each other or within a sentence.

Boolean search, where documents are selected because they contain or don't contain certain words.

Wildcard searches, using front, middle, and end masking, as well as word and character masking.

The DB2™ Text Extender also supports searching hyphenated words and deploys linguistic search methods to find compound words. The response to a search is a list of documents that satisfy the conditions.

The DB2™ Text Extender supports loading documents into the DB2™ database from a variety of industry-standard document formats. Linguistic functions (such as synonyms) are available based on dictionaries for 17 national languages. Linguistic search is supported for that subset of document formats that identify the languages of their content. Search support data (indexes) are initially created from data loaded into the DB2™ table through supplies data preparation facilities. The indexes are updated from data collected automatically by triggers when application programs maintain the documents in the table.

Overall, the DB2™ Text Extender provides a UDT to represent the index column type in the business table and UDFs to search and retrieve selected text attributes (for example, text format). Triggers are provided for purposes such as maintaining a log of changes to the business table, or periodic updating of the index tables. Administrative facilities are provided for establishing and maintaining indexes. A highlighting text browser function (or GUI component) is included which users may invoke from within their application programs to display retrieved documents and to show the "hit" words or phrases.

Text search is a fundamental search technology, and may be applied to the retrieval of many other kinds of data. Most kinds of data can be described by keywords or by an abstract, and text search can be used against these descriptions to locate the subject data item. FIG. 7 shows some of the many ways that text can be used in combination with other kinds of data in a table. In interpreting the scenarios in FIG. 7, it should be noted that the DB2™ Text Extender stores its subject text document in a column in the business table, and introduces a second column for indexing purposes. The second column contains the UDT which "owns" the search UDFs.

FIG. 7 (a) An existing text string 714 is stored in a column 712 of a business table. The column type may be VARCHAR, LONG VARCHAR, or CLOB (character based LOB). The additional column 710 is the indexing view of the text, hiding the text search engine 708 along with its search support data (indexes). The programmer deals with this column for search operations.

FIG. 7 (b) Here a document 716 is stored as a LOB. Again, the document is indexed by the search engine 708.

FIG. 7 (c) Here the indexed text describes an image 718 stored in another column. The image might be a simple BLOB, stored as a DB2™ LOB data type, or it might be a DB2™ Image Extender type, stored in a hidden location, and with its own public functional interface of UDFs. The text 714 column (plus its index column 710) provide a means of locating desired images by their text description.

FIG. 7 (d) Here, a column in the application table contains a reference 720 to a file stored externally on a server (in the form of a path and filename). The file is considered to be under the control of the application (i.e., not managed by any extender) and might contain any kind of data relevant to the application. This is a typical approach to handling "unstructured" data in today's data base environments. But here, too, the Text Extender may be used to index that file data, through a column containing a textual descriptive information 714 and its associated index column 710.

Note that all these scenarios share a common characteristic, that in each case the Text Extender might be retrofitted to an existing business table. The character column in case FIG. 7 (a), the character LOB in case FIG. 7 (b), the image column in FIG. 7 (c), and the external file reference in FIG. 7 (d) might all have existed in the business table prior to the addition of the Text Extender indexing column. And, after addition of the Text Extender, each of these data items will continue to be available unchanged to its existing applications.

In all these cases, also, after addition of the Text Extender, combined searches of business data in the table, and text content are possible in a single SQL statement. For example, an SQL statement might request all rows that have keywords X and Y in the same paragraph of the text column, and where the amount is less than 100 in the price column.

B. DB2™ Image, Video, and Audio Extenders

In addition to the Text Extender, three DB2™ multimedia extenders provide the functionality for each of the three primary multimedia data types: image, video and audio.

Since it is not a high priority for these multimedia extenders to support legacy data in existing tables, all support the storage of their BLOB data in either:

The database, in tables controlled by the extender. This data may be resident on DB2™ servers running either DB2™ for AIX V2™ or DB2™ for OS/2® V2.

External file servers for OS/2® and AIX™.

UDFs are provided to create new instances of the multimedia data types, and to return a handle which the application program stores in the business table. These UDFs build all the underlying structure of the instance, and store the multimedia BLOB data in its chosen location. The functions will accept input data for the multimedia instance from program buffers, or from a file. If the multimedia data is to be stored on an external server, it is possible to adopt a file already stored on the server without moving it from its existing location.

UDFs are also provided to retrieve information from a multimedia type column in a table, including the descriptive attributes of the type (for example, image size), and the BLOB data. The data access functions hide the physical location of the BLOB data from the application. Data stored in the database is accessible only through the access functions. Data stored on an external server may also be processed through the access functions, or alternatively the application may obtain the physical path of the data file on the server and use it to process the file directly, or stream it through some suitable service such as MMPM/2™.

A variety of multimedia formats are supported for each type (such as TIF, GIF, BMP for image and WAVE, MIDI for audio). In many cases, the extender extracts attributes from the headers of these multimedia objects as they are loaded into the relational table, relieving the programmer of the need to supply them explicitly. The extenders also accept unrecognized formats for storage and offer the programmer the option of specifying the attributes. In selected cases, conversion routines are provided to convert data between formats on input and output.

Each of these DB2™ Extenders comprises the UDT defining its data type, the UDFs providing its behavior, and triggers to maintain integrity of the extender data structures as business tables containing extender data columns are copied, updated, and deleted. GUI components are provided for certain purposes. For example, rendering routines are included for each extender, and for each supported client platform. Users can optionally incorporate these routines into their applications. Administrative functions are provided for preparing a table to contain a column for an extender data type, and for other housekeeping purposes. A common installation utility is provided for installing the extenders.

III. Description of the Embodiment

This section describes how MultiMedia (MM) Objects are associated with business data, and where the attributes and the BLOB data of an object may be stored. The section also provides design details about data models, rationales, and scenarios. The discussion is centered around an Image Extender; however, the information presented is applicable to other extenders, such as Audio and Video Extender. Sections follow describing the core MM Application Programming Interface (MMAPI) functions.

A. Scenario and SQL Design

Assume that the user created a multimedia personnel database. Within the personnel database, User_A created Table_A with these statements:

| CREATE TABLE Table_A ( | | |
|---|---|---|
| id | CHAR, | /* employee ID */ |
| name | VARCHAR(60), | /* employee name */ |
| picture | DB2Image, | /* employee picture, stored as BLOB */ |
| mgrPicture | DB2Image | /* manager picture, stored in file server */ |
| ); | | |

User_B created Table_B with these statements:

| CREATE TABLE Table_B ( | | |
|---|---|---|
| id | CHAR(6), | /* employee ID */ |
| name | VARCHAR(60), | /* employee name */ |
| picture | DB2Image, | /* employee picture, stored as BLOB */ |
| ); | | |

Note that DB2Image is a User Defined Type (UDT) created by:

CREATE DISTINCT TYPE DB2Image AS VARCHAR(254) WITH COMPARISONS;

1. Data Model

Within a database, all extenders (image, audio, video) share a special qualifier, mmdbsys, all metadata tables and triggers are created and owned by this special qualifier.

When a database is first enabled (for any extender), the base layer creates 2 administrative support tables:

mmdbsys.ExtenderInfo
mmdbsys.MetatableNames

For each extender, there are 4 additional administrative support tables:

mmdbsys.xxxColumns
mmdbsys.xxxBaseImport
mmdbsys.xxxAttrImport
mmdbsys.xxxDeleteLog Where 'xxx' is up to the first 8 characters of the extender name. For example, administrative support tables for Image Extender are named: ImageColumns, ImageBaseImport, ImageAttrImport, ImageDeleteLog.

For each user table that is enabled for an extender, 2 corresponding metadata tables are created: xxxB+time( ) and xxxA+time( ), where 'xxx' is the extender name and time( ) is the current time expressed in number of elapsed seconds since 12:00 am Jan. 1, 1970. For example, ImageB12345678 and ImageA12345678. The ImageB12345678 table holds metadata that are similar for all extenders (e.g.: filename, size, remarks, etc.). The ImageA12345678 table holds metadata specific for Image Extender (e.g.: width, height, number of colors, etc.).

For each image in the user table, there is 1 row in each of the 2 image metadata tables.

There is no limit on the number of image columns a user can have on a table.

The user can choose to store images in DB2 BLOB or in file system.

Within a database, all handle values are unique, persistent tokens. The handle value serves as a key to identify an image.

2. Handle Encoding

Handle value is encoded as follow:

| | | |
|---|---|---|
| time() | 8 characters | Current time (number of seconds since 1/1/1970) |
| delimiter | 1 character | |
| random() | 8 characters | A random number |
| delimiter | 1 character | |
| database name | 8 characters | CURRENT SERVER |
| delimiter | 1 character | |
| base metadata table name | 18 characters | ImageB12345678 |
| delimiter | 1 character | |
| attr metadata table name | 18 characters | ImageA12345678 |
| delimiter | 1 character | |
| qualifier | 8 characters | Qualifier (creator/owner) of the user table. |
| delimiter | 1 character | |
| table name | 18 characters | User table name. |
| delimiter | 1 character | |
| column name | 18 characters | User column name. |
| | Total: 111 characters | |

The ":" character is used as the delimiter.

3. Scenario

The Image Relational Extender design is best illustrated using a given scenario. Assume that it is desired to create the personnel database mentioned earlier. This section explains events that happen at each of the steps (create database, create table, alter table, insert, select, update, delete).

a. Create Database
User Does:

| CREATE DATABASE personnel | /* name of the database */ |
|---|---|
| ON/mmdb | /* what director */ |
| WITH "MM personnel database on /mmdb"; | /* comment */ |
| DBiEnableDatabase (); | |

Note that caller of DBiEnableDatabase( ) must have DBA or equivalent authority. Also, the application must establish a valid connection to the database prior to calling this API.

DB2/CS Does:
  Create the database.
  Create the system tables
  etc.

Image Extender Does:
Inside DBiEnableDatabase( ):
  Call a base layer function, _bestEnbaleDatabase( ) which does among other things):

Syntax for calling __bestEnbaleDatabase( ):

```
__bestEnbaleDatabase(

USER              /* in, current user */
CURRENT SERVER    /* in, database name */
"Image",          /* in, extender name */
"DB2Image",       /* in, Image UDT name */
"createImage      /* In, name of Image
UDF"                 callback stored procedure */
);
```

Check authority of USER using current connection.
Create UDT, DB2Image:

```
CREATE DISTINCT TYPE DB2Image AS
VARCHAR(254) WITH COMPARISON;
```

Create these administrative support (metadata) tables:

```
mmdbsys.ExtenderInfo       /* contains one row for
                              each extender installed */
mmdbsys.MetatableNames     /* contains one row for
                              each user table that is MM
                              enabled */
mmdbsys.ImageColumns       /* contains one row for
                              each column of DB2Image
                              type */
mmdbsys.ImageBaseImport    /* contains one row for
                              each importing image */
mmdbsys.ImageAttrImport    /* contains one row for
                              each importing image */
mmdbsys.ImageDeleteLog     /* log external image
                              filename being deleted */
```

Add a row to ExtenderInfo table:

```
extender = "image"    /* extender name */
udt = "DBTImage"      /* UDT name */
```

Call the createImageUDF( ) callback routine which alter ImageAttrImport tabale to add image specific columns.

Note that the UDT, all metadata tables and UDFs are created under mmdbsys userid.

b. Create Table
Now User_A wants to create Table_A.
User Does:

```
EXEC SQL CREATE TABLE emp ( id       CHAR(6),       /* employee ID */
name     VARCHAR(60),   /* employee name */
picture  DB2Image,      /* employee picture, stored as
                           BLOB */
);
DBiEnableTable("Table_A");    /* base table name, qualified
                                 or unqualified */
DBiEnableColumn("Table_A",    /* base table name, qualified
                                 or unqualified */
"picture",                    /* image, column name */
DBI_INTERNAL,                 /* bitmask, storage type =
                                 BLOB */
NULL,                         /* import action, not
                                 applicable */
NULL);                        /* delete action, not
                                 applicable */
```

Note that caller of these APIs must have "alter table" or higher authority on the subject table. Also, the application must establish a valid connection to the database prior to calling these APIs.

MMDM Does:
Inside DBiEnableTable( ):
Call a base layer function, __bestEnableTable( ) which does (among other things):
Syntax for calling __bestEnbaleTable( ):

```
__bestEnbaleTable(

USER             /* in, current user */
CURRENT          /* in, database name */
SERVER
"Image",         /* in, extender name */
"User_A.         /* in, fully qualified user
Table_A",           table name */
attrTableName    /* out, image specific metatable
                    name */
);
```

Check authority of USER using current connection.
Generate metadata table names: "ImageB"+time( ) and "ImageA"+time( ) . Let's say the generated names are "ImageB12345678" and "ImageA12345678."

Create 2 metadata tables: mmdbsys.ImageB12345678 and mmdbsys.ImageA12345678. Note that at this step, the Base Layer has enough information to create extender specific columns for mmdbsys.imageA12345678.

A new row is added to mmdbsys.MetatableNames:

```
extender = "Image"
tQualifier = "User_A"
tName = "Table_A"
basemetatableName = "mmdbsys.ImageB12345678"
attrMetatableName = "mmdbsys.ImageA12345678
```

Inside DBiEnable Column( ):
Call a base layer function, __bestEnableColumno which does (among other things):
Syntax for calling __bestEnbaleColumn( ):

```
__bestEnbaleColumn(

USER             /* in, current user */
CURRENT SERVER   /* in, database name */
"Image",         /* in, extender name */
"User_A.         /* in, fully qualified user
Table_A",           table name */
"picture",       /* column name */
DBI_INTERNAL     /* bitmask, storage type =
                    BLOB */
NULL,            /* import action, not
                    applicable */
NULL             /* delete action, not
                    applicable */
);
```

Check authority of USER using current connection.
A new row is added to mmdbsys.ImageColumns:

```
tQualifier = "User_A"
tName = "Table A"
userColumn = "picture"
basemetatableName = "mmdbsys.ImageB12345678"
attrMetatableName = "mmdbsys.ImageA12345678"
storageType = DBI_INTERNAL
controlSource = NULL
deleteSource = NULL
```

Create "insert triggers" on User_A.Table_A. See section "3.10 Trigger Definition" on page 37 for details.
Create "update triggers" on User_A.Table_A. See section "3.10 Trigger Definition" on page 37 for details.

Create "delete triggers" on User_A.Table_A. See section "3.10 Trigger Definition" on page 37 for details.
  c. Alter Table
Later, User_A wants to add a mgrPicture column.

```
EXEC SQL ALTER TABLE Table_A
  ADD mgrPicture DB2Image;
DBiEnableColumn("Table_A",      /* base table name */
  "mgrpicture",                 /* image, column name */
  DBI_INTERNAL,                 /* bitmask, storage type = file */
  'N',                          /* on import, do not change
                                   access rights of the file */
  'Y');                         /* on delete, remove the source
                                   image file */
```

Image Extender Does:
  Inside DBiEnableColumn( ), working together with _bestENableColumn( ):
  A new row is added to mmdbsys.ImageColumns:

```
tQualifier = "User_A"
tName = "Table_A"
userColumn = "picture"
basemetatableName = "mmdbsys.ImageB12345678"
attrMetatableName = "mmdbsys.ImageA12345678"
storageType = DBI_EXTERNAL
controlSource = 'N'
deleteSource = 'Y'
```

Create the insert, update, delete triggers on User_A.Table_A just like those in section "2.3.2 Create Table" on page 21, substituting "mgrPicture" for "picture."
  d. Insert with VALUES Clause
Suppose User_A want to add a record for Tri Ha into Table_A.
User Does:

```
EXECT SQL INSERT INTO Table_A
  VALUES("148378", "Tri Q. Ha",
    DB2Image(CURRENT SERVER, "hvFILE, "Tri's
      picture without touchup");
    DB2Image(CURRENTSERVER,
      "/managers/fctung.bmp:, "manager = Frank
      Tung")
  );
```

Image Extender Does:
Inside the first DB2Image( ):
  Since it is not known what user table or what user column this image is for, a temporary row is added to the ImageBaseImport table. The "insert triggers" will move it to the correct metadata table later. Depending on what version of DB2Image( ) UDF is called, the storage type for this image can be deduced. A unique, persistent handle is returned which serves as the key to identify this object.

```
handle=time(): random():         /* sysmmdb is a dummy
CURRENT SERVER: sysmmdb             key */
validFlag = 'N'
importTime = CURRENT TIMESTAMP
remarks = "Tri's picture
  without touchup"
size = size of the image
storageType = DBI_INTERNAL
filename = NULL
content = content of the image
BLOB
```

Another temporary row is added to the ImageAttrImport table. At this time, automatic processing is done to compute all image specific metadata (number of colors, format, size, thumbnail, etc.). These metadata (along with user marks) can be used later for queries.

```
handle=time(): random():         /* sysmmdb is a dummy
CURRENT SERVER: sysmmdb             key */
validFlag = 'N'
width = width of the image
height, format, ...
thumbnail = thumb nail of the
  image
```

Inside the second DB2Image( ):
  A new row is added to the ImageBaseImport table:

```
handle=time(): random():         /* sysmmdb is a dummy
CURRENT SERVER: sysmmdb             key */
validFlag = 'N'
importTime = CURRENT TIMESTAMP
remarks = "manager = Frank
  Tung"
size = size of the image
storageType = DBI_INTERNAL
filename =
  "/managers/fctung.bmp"
content = NULL
```

Another new row is added to the ImageAttrImport table:

```
handle=time(): random():         /* sysmmdb is a dummy
CURRENT SERVER: sysmmdb             key */
validFlag = 'N'
width = width of the image
height, format, ...
thumbnail = thumb nail of the
  image
```

Once this is completed, two insert triggers (one for picture, one for mgrPicture) are fired.
  e. Insert with Full Select
Suppose that Table_A had been fully populated. User_B created a test table, TB_test, with the same schema as Table_A. He also called DBiEnableTable( )) and DBiEnableColumn( )). Two metadata tables, mmdbsys.ImageB87654321 and mmdbsys.ImageA87654321 were created for TB_test.
  Now User_B wants to fill TB_test using data stored in User_A.Table_A.
User Does:

```
EXEC SQL INSERT INTO TB_test
  SELECT * FROM User_A.Table_A;
```

Image Extender Does:
  The SQL statement above would cause the "insert triggers" defined on TB_test to fire.
  Note that there are now 2 copies of the same BLOB, one is User_A.Table_A.picture, another in User_B.TB_test.picture.
  Also note that even though User_A.Table_A.mgrPicture and User_B.TB_test.mgrPicture point to the same file, the handle value in Table_A.mgrPicture is not the same as the handle value in TB_test.mgrPicture because the table name is encoded in the handle.
  f. Select
Suppose User_B wants to see the thumbnail images of all employees whose pictures were taken sometime in 1994.

User Does:

```
EXEC SQL SELECT name, Thumbnail(picture)
    FROM TB_test
    WHERE Remarks(picture) LIKE '%taken%1995%';
```

Image Extender Does:

For each row of TB-test, the DBMS invokes Remarks(), which returns the user remarks on that image. If any of them match the search pattern in the WHERE clause, DBMS invokes Thumbnail( ), which returns bit stream of type LONG VARCHAR (sizes vary from 3K bytes to 9K bytes). Note that the user is still responsible for displaying the thumbnail using whatever operation system supports that he/she has.

g. Update

Design note Feb. 20, 1995: update comes in 3 flavors:

```
/* update remarks only*/
Remarks(DB2Image handle,           /* handle value */
    LONG VARCHAR *newRemarks       /* replace the old
                                      remarks */
/* update image content only
*/
Content(DB2Image handle,           /* handle value */
    BLOB(2G) *imageContent         /* replace the old
                                      image */
);
```

These two cases are treated as get/set object attribute, thus the handle value does not change. The third case involves changing both image content and user remarks, this is treated as creating a new object. The only way a user can do this is by calling DB2Image( ). In this case, a new handle value is returned.

Suppose User_B wants to update a person's ("NAME") picture and its associated remarks.

User Does:

```
EXEC SQL UPDATE TB_test
    SET picture = DB2Image(:hvFILE, "NAME's touched-
        up picture using Adobe Photo Shop")
    WHERE name = 'NAME';
```

Image Extender Does:
Inside DB2Image( ):
A new row is added to mmdbsys.ImageBaseImport:

```
handle=time( ): random( ):          /* sysmmdb is a dummy
CURRENT SERVER: sysmmdb                key */
validFlag = 'N'
importTime = CURRENT TIMESTAMP
remarks = "NAME's touched-up
picture using Adobe Photo
Shop"
size = size of the image
storageType = DB1_INTERNAL
filename = NULL
content = content of the image
BLOB
```

Another new row is added to the mmdsys.ImageAttrImport:

```
handle=time( ): random( ):          /* sysmmdb is a dummy
CURRENT SERVER: sysmmdb                key */
validFlag = 'N'
``` width = width of the image
height, format, . . .
thumbnail = thumb nail of the
image The old rows in the metadata tables are not changed. Note that the BLOB or the old metadata rows cannot be deleted because the current SQL statement may be rolled back. However, if a new row is added successfully, the triggers are fired. At this point, the old metadata rows are deleted. The external image files are only deleted by calling DBiReorgMetadata Tables( ).

h. Delete

User_B wants to delete NAME's record from the TB_test table.

User Does:

```
EXEC SQL DELETE FROM TB_test
    WHERE name = 'NAME';
```

Image Extender Does:
The "delete triggers" are fired.

B. Metadata Table and Trigger Descriptions

This section describes the table definition and table naming convention for all tables created by the extenders. It will also document the naming convention for triggers and handles.

Following is a summary of all the tables created and used by the extenders:

| | |
|---|---|
| Extender Information Table | one per database |
| Metadata Information Table | one per database |
| Delete Log Table | one per extender |
| Column Information Table | one per extender |
| Import Base Metadata Table | one per extender |
| Import Attribute Metadata Table | one per extender |
| Base Metadata Table | one per user table and extender |
| Attribute Metadata Table | one per user table and extender |

1. Multimedia Column (MM Column)

A column is called MM Column if it is enabled for a multimedia extender.

2. Extender Information Table (one per database)

There is only one such table for each database. It is used to record all the multimedia extenders that this database is enabled for. It also records the UDT associated with the extender.

a. Naming Convention
MMDBSYS.EXTENDERINFO
b. Table Definition

| EXTENDERNAME | VARCHAR(8) | NOT NULL |
|---|---|---|
| UDTNAME | VARCHAR(18) | NOT NULL |

3. Metadata Information Table (one per database)

There is only one such table for each database. It is used to record the name of base metadata table and attribute metadata table that are associated with a user table which has been enabled for a particular extender.

a. Naming Convention

| MMDBSYS.METATABLENAMES |
|---| b. Table Definition

| | | | |
|---|---|---|---|
| EXTENDER | VARCHAR(8) | NOT NULL | |
| TQUALIFIER | CHAR(8) | NOT NULL | |
| TNAME | VARCHAR(18) | NOT NULL | |
| BASEMETATABLENAME | VARCHAR(27) | NOT NULL | /*qualified table name*/ |
| ATTRMETATABLENAME | VARCHAR(27) | NOT NULL | /*qualifier table name*/ |
| PRIMARY KEY (EXTENDER, TQUALIFIER, TNAME) | | | |

4. Delete Log Table (one per extender)

This table is to keep track of all the file names associated with MM columns in rows that are deleted.

a. Naming Convention

| MMDBSYS.xxxDELETELOG |
|---| where xxx is the up to 8 character extender name.

Example: MMDBSYS.IMAGEDELETELOG is the delete log table name for IMAGE extender.

b. Table Definition

| | | |
|---|---|---|
| HANDLE | xxx | NOT NULL PRIMARY KEY, |
| FILENAME | LONG | VARCHAR |
| | where xxx is the up to 18 char UDT associated with the extender. | | where xxx is the up to 18 char UDT associated with the extender.

Example. delete log table definition for Image extender with UDT DB2Image will be

| | |
|---|---|
| HANDLE | DB2Image NOT NULL PRIMARY KEY |
| FILENAME | LONG VARCHAR |

5. Column Information Table (one per extender)

This table is to record the property of all the MM columns that are enabled for a particular extender. There is one row per MM column.

a. Naming Convention

| MMDBSYS.xxxCOLUMNS |
|---| where xxx is the up to 8 character extender name.

For example. column information table name for image extender is MMDBSYS.IMAGEDELETELOG.

b. Table Definition

| | |
|---|---|
| TQUALIFER | CHAR(8) NOT NULL, |
| TNAME | VARCHAR(18) NOT NULL, |
| USERCOLUMN | VARCHAR(18) NOT NULL, |
| BASEMETATABLENAME | VARCHAR(18) |

-continued

| | | |
|---|---|---|
| ATTRMETATABLENAME | VARCHAR(18) NOT NULL, | |
| STORAGETYPE | CHAR, | /*bitmask32: |

-continued

| | | |
|---|---|---|
| | | DB_INTERNAL, DB_EXTERNAL*/ |
| CONTROLSOURCE | CHAR, | /*Y=> on import, change file owner to MMDBSYS */ |
| DELETESOURCE | CHAR, | /*Y=> on delete, remove the image file */ |
| PRIMARY KEY (TQUALIFIER; TNAME, USERCOLUMN) | | |

6. Base Metadata Table (one per user table and extender) and Import Base Metadata Table (one per extender)

There is one base metadata table for each user table and extender. If a user table has been enabled for image extender and audio extender, it will have 2 base metadata tables (one for image extender and one for audio extender). If a user table has been eneabled for image extender only, it will have only one base metadata table.

Base metadata table is used to store information that is common to all extenders such as importer, import time. filename, size, . . . , etc.

The base metadata table will have one row for each MM column in a row in the user table. For example, a user table is enabled for image extender and the user table has 10 MM columns. As rows being inserted to the user column, rows are also inserted into base metadata table. After successfully inserting 5 rows to user table, 50 rows will be inserted to the image base metadata table associated with this user table. The MM column value is used as a key to the base metadata table to retrieve all the related metadata.

The rows in the base metadata table are inserted by the MM extender's insert trigger created for the MM column. The rows in the base metadata table are updated by the MM column's update UDF. The rows in the base metadata table are deleted by the MM columns' delete trigger.

It would be ideal if the rows in the base metadata table can be inserted by the extender import UDF. However, the import UDF knows about database name and extender name but not the user table name. So the import UDF will insert rows to the import base metadata table. Since the after insert trigger know about the user table name. so it will then transfer the rows from import base metadata to the base metadata table associated with the user table.

For this reason, the table definition for these 2 tables are identical.

a. Naming Convention i. Import Base Metadata Table (one per extender)

| MMDBSYS.xxxBASEIMPORT |
|---| where xxx is up to 8 character extender name

For example, import base metadata table name for IMAGE extender MMDBSYS.IMAGEBASEIMPORT.

ii. Base Metadata Table (one per user table and extender)

| MMDBSYS.xxxBttt |
|---| where xxx is up to 8 character extender name and ttt is 9 character time stamp in seconds since 1980

For example, MMDBSYS.ImageB12345678 is a valid base metadata table name for Image extender.

b. Table Definition

| HANDLE | xxx | NOT NULL PRIMARY KEY, | /* Holds same value as associated MMM */ /* column in a row in the user table */ |
|---|---|---|---|
| VALIDFALG | CHAR | NOT NULL, | /* Y=> MM Column was importer successfully */ |
| IMPORTER | CHAR(8), | | /* user id by which import is done */ |
| IMPORTNAME | TIMESTAMP, | | |
| UPDATOR | CHAR(8), | | /* userid by which MM colum is updated */ |
| UPDATETIME | TIMESTAMP, | | |
| REMARKS | LONG VARCHAR, | | /* remarks about the MM column */ |
| SIZE | LONG, | | /* size in bytes about MM object */ |
| STORAGETYPE | CHAR, | | /* bitmask32. DB_INTERNAL, DB_EXTERNAL */ |
| FILENAME | LONG VARCHAR, | | /* in reality the max allowed is 255. Make long */ varchar to gain performance */ |
| CONTENT | BLOB(2G) | | /* The actual content of the MM object if */ /*STORAGETYPE is DB_INTERNAL */ |

For example, xxx will be sent to DB2Audio if this table is defined as the base metadata table for Audio extender with UDT defined as DB2Audio.

7. Attribute Metadata Table (one per user table and extender) and Import Attribute Metadata Table (one per extender)

These tables are used to store extender specific information for each MM column. Again there is one row in the attribute metadata table for each MM column in a row in a user table.

The MM column value is used as a key to the attribute metadata table to retrieve extender specific metadata. The reason for the existence of the import attribute metadata table is the same as that for import base metadata table.

a. Naming Convention i. Import Attribute Metadata Table (one per extender)

| MMDBSYS.xxxATTRIMPORT |
|---| where xxx is the up to 8 character extender name

For example, import attribute metadata table name for IMAGE extender is MMDBSYS.IMAGEATTRIMPORT.

ii. Attribute Metadata Table (one per user table and extender)

| MMDBSYS.xxxAttt |
|---| where xxx is the up to 8 character extender name and ttt is 09 character time stamp in seconds since 1980

For example, MMDBSYS.ImageA123456789 is a valid attribute metadata table name for Image extender.

b. Table Definition

The minimum requirement for this table is to have the HANDLE column. It's extender developer's responsibility to complete this table definition.

| HANDLE | xxx | NOT NULL PRIMARY KEY |
|---|---|---| where xxx is the UDT defined for the extender

For example, xxx will be set to DB2Video if this table is defined as an attribute metadata table for Video extender with UDT set to DB2Video.

8. HANDLE column in Metadata table

The handle in both base and attribute metadata tables holds the same values as the associated MM column in a user table. Most of the extender's UDFs take handle as one of the input argument. The handle values follows the following format so that UDF can take advantage of it. The handle is always a string of length 111 for now even though it's base type is indirectly defined as VARCHAR(254) in the metadata table.

| TIME | 8 character (# of seconds from 1/1/1970) |
|---|---|
| delimitor | 1 character (:) |
| RANDONE NUMBER | 8 character (blank filled) |
| delimitor | 1 character (:) |
| DATABASE NAME | 8 character (blank filled) |
| delimitor | 1 character (:) |
| BASE METADATA TABLE NAME | 8 character (blank filled) |

| | |
|---|---|
| delimitor | 1 character (:) |
| ATTR METADATA TABLE NAME | 8 character (blank filled) |
| delimitor | 1 character (:) |
| QUALIFIER OF USER TABLE | 8 character (blank filled) |
| delimitor | 1 character (:) |
| USER TABLE NAME | 18 character (blank filled) |
| delimitor | 1 char(:) |
| MMCOLUMN NAME | 18 characters |

9. Trigger Naming Convention

The only requirement is that the all upper case extender name should be the first 8 characters and then follow by a time stamp. The trigger name has extender name encoded so that we can disable a particular extender for a user table by dropping all the triggers associated with that user table and extender.

10. Trigger Definition

Triggers are defined for each MM column. All triggers work in the same way regardless of which database, which user table, which column in the table, or even which extender.

To make it easier to understand, all triggers in this section are documented using MM column PICTURE in user table "USERID.TABLENAME" within database 'DATABASE' for IMAGE extender with UDT set to DB1Image. The base metadata table is 'MMDBSYS.IMAGEB123456789' and the attribute metadata table is 'MMDBSYS.IMAGEA124356789'.

The extender, user table, and MM column dependent information in the trigger body is underlined and in italic style. The __bestEnableColumn( ) API will create these triggers.

a. Before Insert Trigger for Insert via Import

```
CREATE TRIGGER IMAGE123456789A
  NO CASCADE BEFORE INSERT ON USERID.TABLENAME
  REFERENCING NEW AS NEW FOR EACH ROW MODE DB2SQL
  WHEN (NEW.PICTURE IN (SELECT HANDLE FROM
  MMDBSYS.IMAGEBASEIMPORT)) BEGIN
  NEW.PICTURE=DB2Image (CONCAT (CAST(NEW.PICTURE AS
VARCHAR(254))),
       ':IMAGEB123456789 :IMAGEA123456789
       :USERID :TABLENAME :PICTURE));
END
``` b. After Insert Trigger for Invert Via Import

```
CREATE TRIGGER IMAGE123456789B AFTER INSERT ON
USERID.TABLENAME
  REFERENCING NEW_TABLE AS NEW
  FOR EACH STATEMENT MODE DB2SQL
  WHEN (EXISTS: (SELECT HANDLE FROM
MMDBSYS.IMAGEASEIMPORT
    WHERE HANDLE IN
    (SELECT DB2Image(SUBSTR(CAST(PICTURE AS
    VARCHAR(254)),
         1,26)) FROM NEW)))
BEGIN
  UPDATE MMDBSYS.IMAGEBASEIMPORT
    SET HANDLE=DB2Image (CONCAT (CAST(HANDLE AS
VARCHAR(254))
       ':IMAGEB123456789 :IMAGEA123456789
       :USERID:TABLENAME:PICTURE),
    IMPORTER=USER,
    VALIDFALG='Y'
    WHERE HANDLE IN
    (SELECT DBImage(SUBSTR(CAST(PICTURE AS VARCHAR(254)),
         1,26)) FROM NEW);
  UPDATE MMDBSYS.IMAGEATTRIMPORT
    SET HANDLE=DBImage (CONCAT (CAST(HANDLE AS
VARCHAR(254)),
       ':IMAGEB123456789 :IMAGEA123456789
       :USERID:TABLENAME:PICTURE),
    IMPORTER=USER,
    VALIDFALG='Y'
    WHERE HANDLE IN
    (SELECT DBImage(SUBSTR(CAST(PICTURE AS
    VARCHAR(254)),
         1,26)) FROM NEW);
  INSERT INTO MMDBSYS.IMAGEB123456789
    SELECT * FROM MMDBSYS.IMAGEBASEIMPORT
    WHERE (HANDLE IN (SELECT PICTURE FROM NEW));
  INSERT INTO MMDBSYS.IMAGEA123456789
    SELECT * FROM MMDBSYS.IMAGEBATTRIMPORT
    WHERE (HANDLE IN (SELECT PICTURE FROM NEW));
  DELETE FROM MMDBSYS.IMAGEBASEIMPORT
    WHERE HANDLE IN (SECECT PICTURE FROM NEW);
  DELETE FROM MMDBSTS.IMAGEATTRIMPORT
    WHERE HANDLE IN (SELECT PICTURE FROM NEW);
END
``` c. Before Insert Trigger for Insert Via Full/Sub Select

```
CREATE TRIGGER IMAGE12345789C
  NO CASCADE BEFORE INSERT ON USERID.TABLENAME
  REFERENCING NEW AS NEW FOR EACH RO MODE DB2SQL
  WHEN (NEW.PICTURE NOT IN (SELECT HANDLE FROM
  MMDBSYS.IMAGEBASEIMPORT))
BEGIN
  NEW.PICTURE=__bestCopy (NEW.PICTURE,
    'USERID', 'TABLENAME',
    'MMDBSYS.IMAGEB123456789',
    'MMDBSYS.IMAGEA123456789');
END
``` d. After Insert Trigger for Insert Via Full/Sub Select

```
CREATE TRIGGER IMAGE123456789D AFTER INSERT ON
USERID.TABLENAME
  REFERENCING NEW_TABLE AS NEW
  FOR EACH STATEMENT MODE DB2SQL
  WHEN (NOT EXISTS (SELECT NEW.PICTURE FROM NEW,
    MMDBSYS.IMAGEBASEIMPORT BASEIMPORT
    WHERE (NEW.PICTURE=BASEIMPORT.HANDLE)))
BEGIN
  UPDATE MMDBSYS.IMAGEB123456789 SET VALIDFLAG='Y'
    WHERE HANDLE IN (SELECT PICTURE FROM NEW);
  UPDATE MMDBSYS.IMAGEA123456789 SET VALIDFLAG='Y'
    WHERE HANDLE IN (SELECT PICTURE FROM NEW);
END
``` e. After Delete Trigger froM MM COlumn with Delete-Source Set to 'N'

```
CREATE TRIGGER IMAGE123456789E AFTER DELETE ON
USERID.TABALENAME
  REFERENCING NEW_TABLE AS NEW
  FOR EACH STATEMENT MODE DB2SQL
BEGIN
  DELETE FROM MMDBSYS.IMAGEB123456789 WHERE
  HANDLE=OLD.PICTURE;
  DELETE FROM MMDDSYS.IMAGEA123456789 WHERE
  HANDLE=OLD.HANDLE;
END
``` f. After Delete Trigger for MM COlumn with Delete-Source set to 'Y'

```
CREATE TRIGGER IMAGE123456789E AFTER DELETE ON
USERID.TABLENAME
    REFERENCING NEW_TABLE AS NEW
    FOR EACH STATEMENT MODE DB2SQL
BEGIN
    INSERT INTO MMDBSYS.IMAGEDELETELOG
        SELECT HANDLE, FILENAME FROM MMDBSYS.IMAGEB123456789
            WHERE HANDLE IN (SELECT PICTURE FROM OLD);
        DELETE FROM MMDBSYS.IMAGEB123456789
            WHERE HANDLE IN (SELECT PICTURE FROM OLD);
        DELETE FROM MMDBSYS.IMAGEA123456789
            WHERE HANDLE IN (SELECT PICTURE FROM OLD);
END
```

C. Data Model

MM objects consist of MM BLOBs that are the actual data of the text, image, etc., and MM Attributes that relate to the BLOB, such as "date of creation". MM objects are identified by a unique identifier called a handle, and business tables reference MM Objects through columns that contain these handles. The handle is the actual UDT defined to the database engine as the MM Object data type, and so a separate column in the business tables is required to represent each MM Object type.

Non-BLOB MM Attributes are accessed through UDF's only. Some attributes, such as "date of creation", are common to all MM Object types, while other attributes, such as "number of frames", are expected to be dependent upon the particular type of MM Object. Furthermore, some MM Attributes may be system generated, e.g., date of creation, or automatically inferred from the contents of the BLOB or its header, while others will need to be specified when an MM Object is created.

MM BLOBs may be stored in the business table in the database, or in a hidden table, or in an external server. The MM BLOBs (regardless of their location) may be accessed in the same manner as other MM Attributes, namely through the handle of the object via UDF's. If this is done, the application can be relatively insensitive to the physical location of the BLOB. BLOBs stored in the business table may also be accessed directly by applications. If this option is chosen, the application will be sensitive to the location of the BLOB.

Streaming of MM BLOBs is accomplished by obtaining the access path (an MM Attribute) of an externally stored MM BLOB, and passing this filename to a service such as MMPM/2 that can handle streaming.

D. Data Access Functions

1. Constructor

```
db2xxxxx (Source, option1, option2, . . .)
``` db2xxxxx( ) is the constructor function that creates new instances of MM Objects of type xxxxx. There is at least one different constructor function for each MM Object type, for example, db2Image( ) and db2Audio( ). db2xxxxx( ) returns the value of an object handle of the appropriate type. To accommodate alternative combinations of optional parameters, there may be a family of similarly named, overloaded constructors for each MM data type.

Source may be a DB2™ LOB type host variable, containing the incoming multimedia data, that may be represented by a LOB type buffer, a client file reference, or a LOB token. The data will be moved to a specified destination.

Source may also specify, through a fully qualified path, a reference to a file that is accessible to the multimedia object server. The file will be "adopted" without copying it from its existing location.

{Dest} may be an optional indicator of where the BLOB is to be stored, either in the business table, in a hidden table, or an external server. If an external server is indicated then a destination file path may be specified. The BLOB data will be copied from the source to the {dest} (unless the source file is to be "adopted" in its present location). If the parameter is absent, storage will be to a system wide default destination, either to a hidden table, or a directory path on an external server.

{Source_format} and {Dest_format} may optionally be specified. {Source_Format} indicates the format of the incoming BLOB. (Note that the source format may be implicitly defined by the BLOB itself). {Dest_format} indicates the format of the BLOB as it is to be stored. If the formats are different the BLOB will be converted before it is stored. The extender should tolerate the absence of these parameters, basically by storing BLOBs as-is.

{Index} may be an optional parameter(s) that controls indexing actions, if supported by the extender (for example, specification of which index to put this particular object in). System-wide defaults will apply if the parameter is absent.

{Attr1, Attr2, . . . } may be a list of optional attribute values for this data type. Absent parameters will cause a suitable default value to be stored. Note that the values of some MM attributes may be generated automatically by the constructor.

2. Content

```
content (handle)
content (handle, option1, option2, .. )
content( handle, source)
```

The content( ) function provides applications with access to MM BLOBs. content(handle) takes a handle and returns a LOB data type, which may be fetched into a LOB host variable (buffer, client file type, or a LOB token).

This simple form of the function is overloaded for all multimedia data types. There may be other forms of content( ) that are specific to particular data types, and include parameters specific to that type (option1, option2, etc.).

The content(handle, source) form of the function updates the MM BLOB value of an object represented by handle (and any other attributes that are automatically inferred from the BLOB or its header). It is overloaded for all data types.

3. AccessPath

```
accessPath (handle)
```

This function returns a char variable containing the full pathname of BLOBs that are stored in external servers, or table and column names of BLOBs that are stored in the database. It is overloaded for all data types.

4. Attribute Access Functions

---
attribute_name (handle)
attribute_name (handle, value)
---

The attribute_name(handle) functions are names for each attribute of the data type, and return the value of that MM attribute. For example, there may be DateofCreation, AttributeOwner, etc. Some functions will be MM Object type dependent (e.g., NumberVideoFrames( )), and others will be type independent (e.g., DateofCreation). The latter functions should be overloaded for all data types.

The attribute_name(handle, value) form of the attribute functions will update the value of the named attribute of an existing MM Object. For example, owner(handle, "Don") changes the attribute "owner" of the object represented by "handle" to "Don".

E. Content Search Functions

---
contains (col_name, criteria)
--- col_name identifies the objects to be searched.
Criteria are the (type dependent) search criteria.

The contains( ) function is overloaded for all data types. The content of Criteria parameter will differ between types, but is expected to take a common form that will be returned by all the GUI buildpredicatexxxx( ) functions (see below). This will allow the applications to set up searches on tables containing various data types without needing to use a different form of predicate for each data type.

The contains( ) function returns a value that indicates how well the search criteria have been met. The form of the function will allow its use as a predicate in a WHERE clause, and/or as the subject of an ORDER BY clause to rank returned rows. Value is between 0 and 100.

---
Usage 1:      SELECT Id, contains(text, search_criteria)
AS relevance
              FROM text_table
              ORDER BY relevance
Usage 2:      SELECT TABLE
    FROM text_table
    WHERE contains(text, search_criteria) > 65
---

Note that search engines may, in addition, provide type dependent content search functions for more specialized forms of search.

F. Content Functions

The list of Content Functions is data type dependent. Some examples might be:
(1) Content manipulation, e.g., rotate( ).
(2) Network traffic reduction, e.g., compress( ).
(3) Format transformation, e.g., TIFF_to_GIF.
(4) Other, e.g., encrypt.

(Note that format transformation might be a candidate for a content function, as well as being a "built-in" facility of the Import and Export functions described above. There may be other functions, as well as these conversion functions, where there is value in providing the functionality in both forms.)

G. Support for SQL Operations

All extenders are expected to handle the following forms of SQL operations on a subject business table:

1. Setting Extender data type column to NULL

When the Extender data type column value is set to NULL, the data type instance should be deleted, in the sense that it is subsequently inaccessible by applications. Actual physical clean up is implementation dependent.

2. Row delete

When a row of the business table is deleted, an extender data type instance in that row should be deleted.

3. Table drop

When a table containing Extender data type columns is dropped, all extender data type instances in that table should be deleted.

4. Copies

When an Extender data type is copied into another table location:

a. A new logical copy of that data type instance should be created, in the sense that the original copy and the new copy will appear to applications as distinct instances, and all subsequent operations (update, delete, etc) to these two instances will be independent. (Whether the data is actually physically copied, and when, is implementation-dependent.)

b. The data type instance that was previously held in the copy destination (if any) should be deleted.

H. Client GUI Functions

GUI "functions" are assumed to be in the form appropriate for the main programming environments on each client platforms.

There are two GUI functions that are considered core functions, and should be provided by all extenders.

1. Build a SQL SELECT search predicate expression.

---
BuildPredicatexxxxx( )
---

This function will open a suitable basic dialog on the screen and elicit information from the user on the search criteria for the data type xxxxx. It will update a criteria variable that can be embedded in a content search "contains( )" function in the WHERE clause of a SQL SELECT statement. The content of the criteria will differ between data types, but the declaration of the criteria should be common for all data types.

Note that extenders may, in addition, provide type dependent GUI components that establish specialized dialogs with the user to perform specialized forms of content search.

2. Render the data type.

---
renderxxxxx()
---

The renderxxxxx( ) function will take an object of type xxxxx and render it on an output device in an appropriate way.

I. API Usage Scenarios (Note that the syntax in these examples is approximate.)

---
1. Import
//
// Import some information about an X-ray (date etc), an image of
// the x_ray and a textual transcript of a consultant's comments
// about the x-ray.
BEGIN DECLARE
    char file_var';30'
END DECLARE
//
// Call a function that returns the name of a client file
// containing the X-ray.
//
---

```
call retrieve_xray( file_var )
//
// The DB2Image constructor returns handles for the text and the
// image and these are inserted into the xray_analyses table.
// The image of the X-ray is passed to the constructor using a
// file reference host variable, the image is converted into a TIFF
// image during import(it was originally in PCX format), and a copy
// of it is stored in an external server called server1. The text
// is stored in local file, a copy is made on an external server,
// server2, and it is indexed by default (by the default search
// retrieval engine).
//
INSERT INTO xray-analyses( date, orientation, technician,
consultant, xray, transcript)
    VALUES( 3/4/94, "saggital", "B.F.Grey", "C.G.Hardy",
    DB2Image. :file_var, server1,PCX,TIFF,NOINDEX,5/5/94)
    DB2Image( C: rans29.rtf, server2,,,,6/6/94) );
    2. Search
//
// In this scenario, a search is being made for X-rays taken this
// year that contain a certain visible feature, and which are
// associated with a textual transcript that contains the word
// "unidentified".
//
BEGIN DECLARE
    char visible features'/*100';
    char orient'/*10'
    date date
    char file_var'/*30+
    ptr my_buffer
END DECLARE
//
// Get the image search criteria from the user
//
call get_image_criteria( visible_features )
//
// The query finds records in which the date of the X-ray is this year,
// year, there is a high probability (>80%) that the image
// specified by the user is in the X-ray, and the transcript
// contains the word "unidentified". The query results are
// written out to host variables, specifically, the access path
// (filename) of the X-ray image and the text of the transcript are
// returned.
//
DEFINE C1 AS CURSOR FOR
SELECT
    orientation, date,
    access_path( xray ),
    content( transcript )
FROM
    xray_analyses
WHERE
    date > 1994 AND
    contains( xray, :visible_features ) > 80 AND
    contains( transcript, "unidentified" ) = 1
//
// Loop used to read each record returned by the query.Orientation,
// date and the X-ray filename are returned into 'normal' host
// variables, the transcript is written to a buffer. These are
// then passed to an application routine, display_app, for
// selection/display to the user.
//
loop while true
    FETCH C1 INTO :orient, :date, :file_var, :my_buffer
    display_app( orient, date, file_year, my_buffer)
end loop
```

While various embodiments of the present invention have been described above, it should be understood that they have been presented by way of example, and not limitation. Thus the breadth and scope of the present invention should not be limited by any of the above described exemplary embodiments, but should be defined only in accordance with the following claims and their equivalents. It will be understood by those skilled in the art that various changes in form and detail may be made therein without departing from the spirit and scope of the invention.

Having thus described our invention, what we claim as new and desire to secure by Letters Patent is:

1. A computer-readable storage medium storing a relational extender for a computer-based relational database, the relational extender providing the relational database with access to object data, comprising:

a first table having a user defined application database, and at least one column dedicated to an object handle created by the user for defining the complex data type of an object;

a second table containing at least one column defining a unique characteristic associated with said one object and one column dedicated to containing said object handle;

a third table containing at least one column defining a common characteristic associated with all objects defined within said first table and one column dedicated to containing said object handle and at least one column dedicated to containing a reference to object data associated with said object;

a fourth table storing each object handle and its associated complex data type as defined in said first table; and a fifth table containing the names of said second and third tables for each object defined in said first table.

2. A computer-readable storage medium storing a relational extender according to claim 1, further comprising a sixth table containing a reference to each object handle removed from said first table and including one column dedicated to containing a reference to the location of the object data associated with said removed object handle.

3. A computer-readable storage medium storing a relational extender according to claim 2, further comprising a seventh table having at least one column which describes a property of an object defined in said first table.

* * * * *

UNITED STATES PATENT AND TRADEMARK OFFICE
CERTIFICATE OF CORRECTION

PATENT NO. : 5,799,310

DATED : August 25, 1998

INVENTORS : Anderson *et al.*

It is certified that an error appears in the above-identified patent and that said Letters Patent is hereby corrected as shown below.

On title page, item [21] "Appl. No.:" after "548,301 add --(Continuation of 08/431,513, May 1, 1995, abandoned)--.

In column 1, line 5, before "This", insert --This is a continuation application of Serial No. 08/431,513, filed May 1, 1995, now abandoned.--;

In the Drawing:

In Figure 5 of the drawings, delete the word "COMPACT" and insert --CONTENT-- (2 instances).

Signed and Sealed this

Twelfth Day of October, 1999

Attest:

Attesting Officer

Q. TODD DICKINSON

*Acting Commissioner of Patents and Trademarks*